(12) United States Patent
van Doornewaard

(10) Patent No.: US 10,798,934 B2
(45) Date of Patent: Oct. 13, 2020

(54) KIT FOR AIR TREATMENT OF UPHOLSTERED FURNITURE AND METHOD OF USING SUCH KIT

(71) Applicant: Pure-development 1 B.V., Ouderkerk aan de Amstel (NL)

(72) Inventor: Barry van Doornewaard, Ouderkerk aan de Amstel (NL)

(73) Assignee: PURE-DEVELOPMENT 1 B.V., Ouderkerk aan de Amstel (NL)

( * ) Notice: Subject to any disclaimer, the term of this patent is extended or adjusted under 35 U.S.C. 154(b) by 137 days.

(21) Appl. No.: 15/114,038

(22) PCT Filed: Jan. 28, 2015

(86) PCT No.: PCT/NL2015/050052
§ 371 (c)(1),
(2) Date: Jul. 25, 2016

(87) PCT Pub. No.: WO2015/115890
PCT Pub. Date: Aug. 6, 2015

(65) Prior Publication Data
US 2016/0345571 A1   Dec. 1, 2016

(30) Foreign Application Priority Data

Jan. 28, 2014   (NL) ...................... 2012158

(51) Int. Cl.
*A01M 1/22*   (2006.01)
*A01M 13/00*   (2006.01)
(Continued)

(52) U.S. Cl.
CPC .......... *A01M 3/007* (2013.01); *A01M 1/2094* (2013.01); *A01M 13/003* (2013.01); *A47C 31/00* (2013.01); *A47C 31/007* (2013.01)

(58) Field of Classification Search
CPC ...... A01M 1/2094; A01M 1/22; A01M 13/00; A01M 13/003
(Continued)

(56) References Cited

U.S. PATENT DOCUMENTS 5,678,352 A * 10/1997 Leitner ............... A01M 13/003
43/124
2003/0145380 A1   8/2003 Schmid
2012/0285944 A1   11/2012 Bermudez

FOREIGN PATENT DOCUMENTS

GB        379439      9/1932
GB        2334889     9/1999
WO    WO 2013/017869  2/2013

OTHER PUBLICATIONS

International Search Report from PCT/NL2015/050052 dated Feb. 26, 2015.
Office Action from GB App No. 15703645.0 dated Mar. 14, 2018.

\* cited by examiner

*Primary Examiner* — David J Parsley
(74) *Attorney, Agent, or Firm* — Adsero IP

(57) ABSTRACT

A kit for extermination of pest animals in furniture and a method for using the kit are disclosed. A sheet is provided over upholstered furniture. The sheet may be provided with ballast at the edges for keeping the sheet more or less fixed. Heated air is forced underneath the sheet. The furniture is preferably provided with an air treatment module for forcing air through the upholstery like a mattress. This allows the heated air provided by the forced air supply to be provided to the upholstery via the inside, highly increasing efficiency of heat treatment of the furniture. A way of controlling temperature of air provided by the forced air supply is disclosed, as well as a way of controlling temperature of air actually within the spaced defined by the positioned sheet.

(Continued)

The latter allows for improved control of maintaining a temperature at which for example bed bugs are killed.

14 Claims, 3 Drawing Sheets

(51) Int. Cl.
 *A01M 3/00* (2006.01)
 *A47C 31/00* (2006.01)
 *A01M 1/20* (2006.01)
(58) Field of Classification Search
 USPC .................................. 43/124, 132.1, 144
 See application file for complete search history.

KIT FOR AIR TREATMENT OF UPHOLSTERED FURNITURE AND METHOD OF USING SUCH KIT

RELATED APPLICATIONS

This application is a 35 U.S.C. § 371 national phase application of PCT/NL2015/050052 (WO 2015/115890), filed on Jan. 28, 2015, entitled "Kit for Air Treatment of Upholstered Furniture and Method of Using Such Kit", which application claims priority to Netherlands Application No. 2012158, filed Jan. 28, 2014, each of which is incorporated herein by reference in its entirety.

TECHNICAL FIELD

The various aspects relate to a kit for a heat treatment of furniture and upholstered furniture in particular and a method of use of the kit.

BACKGROUND

Bed bugs (*Cimex lectularius*) are a problem for beds and people using them due to their bites causing irritation with humans whose blood they feed on. Heat treatment of spaces or material the bed bug is residing in is a cumbersome way to kill bed bugs. A significant amount of heat is required, provided for a relatively long time. In particular for upholstered furniture, a long exposure time is usually required to heat furniture through and through due to the isolating properties of the upholstery.

GB 2 334 889 A Discloses an apparatus for killing dust mites comprising a cover and a fan blower. The air is heated above 60 degrees Centigrade to dehumidify the incoming air. The cover includes an elastic region to permit the cover to from an air-tight seal around a mattress. At the side of the cover, a filter is provided for letting air escape from the cover.

US 2012/285944 A1 Discloses a self-inflating heat chamber for killing bedbugs. Air is taken in from the chamber or via make-up valve. The air is heated to about 70 degrees Centigrade by means of a resistance heater. The heated air is provided to the heat chamber by means of a ducted fan. The heater and the fan are provided in a heater unit of which the inlet and the outlet are connected to the heat chamber by means of ducts.

US 2003/145380 A1 Discloses a sheet of pliable, washable material to cover at least part of a piece of furniture. The sheet helps reduce exposure to house dust mite. The sheet is fitted having an elastic retainer at a skirt portion, allowing the sheet to be tucked underneath the mattress for securing the sheet to the mattress. An air delivery unit is provided to deliver air to the sheet. For killing mites, air with a temperature exceeding 50 degrees Centigrade is provide to the sheet.

WO 2013/017869 Discloses an apparatus for taking in air from a mattress, dehumidifying the air and providing the dehumidified air back to the mattress. Temperature of the outlet temperature is varied between 15 and 30 degrees Centigrade.

SUMMARY

It is preferred to provide a kit for extermination of pest animals in furniture and other materials by means of heat treatment that is more convenient to use.

A first aspect provides a kit for air treatment of upholstered furniture. The kit comprises—a cover sheet for covering the furniture, the cover sheet being arranged to define a space having substantially similar dimensions as outer dimensions of the furniture, the space being open at the bottom. The sheet comprises an outer edge being arranged to define an outer perimeter of the sheet having a sheet edge circumferential dimension substantially similar to a furniture footprint circumferential dimension; and a first opening provided in the vicinity of the outer edge for receiving air from a forced air supply unit in the space. The kit also comprises a forced air supply module for providing heated air. The forced air supply module comprises a filter for filtering air taken in by the air supply module, an air displacement module for displacing air, a heating module for heating air taken in, a first temperature sensor for sensing a temperature of heated air and a control module connected to the first temperature sensor and the heating element for controlling heating activity of the heating element. Furthermore, the kit comprises a first conduit for connecting the forced air supply module to the first opening provided in the sheet for providing air heated by the forced air supply unit to the to the space defined by the sheet.

The sheet may be provided over the furniture, like a bed, basically covering the furniture to the ground. Subsequently, the forced air supply may be connected to the first opening in the sheet by means of the first conduit for providing heated air to the space defined by the sheet, in which the furniture is provided. In this way, the furniture may be heated for extermination of bed bugs and/or other pest animals, arthropoda in particular.

This kit is particularly suited for use with a bed as described in a European patent application published as EP1804616. Such beds already comprise a forced air supply with heating, in particular for providing heated air through the mattress. However, the capacity of a fan that can be operated without providing a noise level that may bother a person sleeping in the bed is not sufficient for providing enough heated air through the mattress for properly heating the mattress for properly exterminating of bed bugs. This is also the case if the bed itself is covered. A commercial implementation of the disclosure of EP1804616 may work for killing dust mites by controlling the humidity level within the mattress, but will not be able to heat the bed on the inside and outside to such a level in a reasonable amount of time for killing bed bugs.

Furthermore, while heating of the bed for normal use would require a heating element with a power of about 400 Watt, heating the bed for extermination of bed bugs requires a heating element with a power between 1.5 and 3 kilo Watt, about five times as much. Permanently fitting the ventilated bed with a fan and a heating unit suited for extermination of bed bugs is therefore not an option—the equipment would be overly dimensioned for daily use. Furthermore, this would not result in a bed suitable for daily use due to the noise level of the fan and because overdimensioning of the heating element may result in excessive power consumption.

Use of the kit eliminates the need for overdimensioning the parts of the air treatment module of the bed. Furthermore, as the bed comprises an arrangement for blowing air through a mattress, pre-heated air provided by the forced air supply below the bed or other furniture, is blown through the mattress. This means the mattress is also heated from within—rather than only from the inside or only from the outside of the mattress. Further air provided by the forced air supply is provided around the mattress, under the sheet. This results in the mattress reaching a temperature of preferably about 50 degrees Centigrade at the outside and the inside of the mattress and the rest of the bed and its upholstery in a much faster way than with methods currently know, thus significantly decreasing treatment time. This is particularly advantageous in hotels, where time between check out and check in of guests may be limited. Another advantage for use in hotels is that the kit can be provided in a relatively small package that may be carried to a room in a discrete way. This is very important, as presence of bed bugs in a hotel may be disastrous for the reputation of the hotel.

In an embodiment of the first aspect, the outer edge is provided with at least one ballast unit.

With air forced in the space defined by the sheet, the sheet may be lifted from a floor on which the furniture is placed. This reduces the effect of the sheet keeping heated air confined around the furniture. Other available solutions tackle this issue by providing a sheet material all around the furniture, including below the furniture, which means furniture has to be lifted to place sheet material for a tent underneath the furniture. This type of heavy work is mitigated by providing ballast elements in the outer edge of the sheet, thus forcing the outer edge of the sheet and with that, the whole sheet, towards the floor and keeping heated air confined in the space defined by the sheet.

The sheet defining a space that is not fully closed by the sheet at the bottom of the space has an additional advantage that the floor below the furniture received a heat treatment as well. Commercially available tents for extermination of bed bugs use thick isolating material, also at the bottom of the tent. The isolating material prevents heat transfer to the floor. For treatment of the floor for killing bed bugs, an additional heat treatment of the room is required—and even in such case, it may take many hours to get the inside of a mattress at a proper temperature for killing bed bugs. By leaving the space under the sheet open, as is the case with the aspect discussed here, heated air provided to the space flows directly over the floor, also killing pest animals located on the floor, for example in tapestry.

In another embodiment of the first aspect, the cover sheet is provided with a second opening, the second opening being located substantially at the top of the space and the kit further comprises a second duct for connecting the second opening to the forced air supply module for providing air from the space to the forced air supply module.

This kit allows for recirculation of heated air, thus reducing energy required for heating air provided to the spaced defined within the sheet provided over the furniture.

In a further embodiment of the first aspect, the forced air module further comprising an ozone generator for generating ozone and providing the ozone to the space defined by the cover sheet.

This embodiment allows for ozone treatment of the furniture and the upholstery in particular. Whereas ozone may not kill arthropoda—or at least not all—, such treatment may be very effective against bacteria, mould and protozoans. This, in turn, is an important additional advantage when treating for example beds in hotels, allowing the beds to be disinfected, at least to a large extent.

A second aspect provides a method of exterminating pest animals from upholstered furniture by using the kit according to the first aspect. The method comprises laying the cover sheet over the furniture, such that the outer edge of the sheet is provided on or at least in the vicinity of a ground plane on which the furniture is placed connecting the force air supply module to the opening in the sheet, via the conduit; and providing heated air to the space defined by the cover sheet via the conduit.

This aspect provides a method that is efficient and convenient to carry out. Other methods of providing heat treatment to furniture for extermination of pest animals require setting up a large tent and require multiple persons for carrying out the method. The method provided by this second aspect may be carried out by one person only, making it more efficient.

In an embodiment of the second aspect, the furniture comprises an arrangement for providing an airflow through the upholstery, the method further comprising activating the arrangement for providing the airflow.

As indicated, the first aspect is particularly suitable for use with a bed as disclosed by a European patent application published as EP1804616. As indicated by this embodiment of the second aspect, switching on the arrangement for providing the airflow through the bed increases effectiveness of the method of the second aspect.

In another embodiment of the second aspect, the arrangement for providing an airflow comprises a heating element for heating air for the airflow, the method further comprising activating the heating element.

Although the air provided by the forced air supply is preferably already well heated, additional heating may be desirable for ensuring a stable level of temperature of air provided to the mattress.

BRIEF DESCRIPTION OF THE DRAWINGS

The various aspects and embodiments thereof will now be discussed conjunction with Figures. In the Figures.

DETAILED DESCRIPTION

Figure 1:
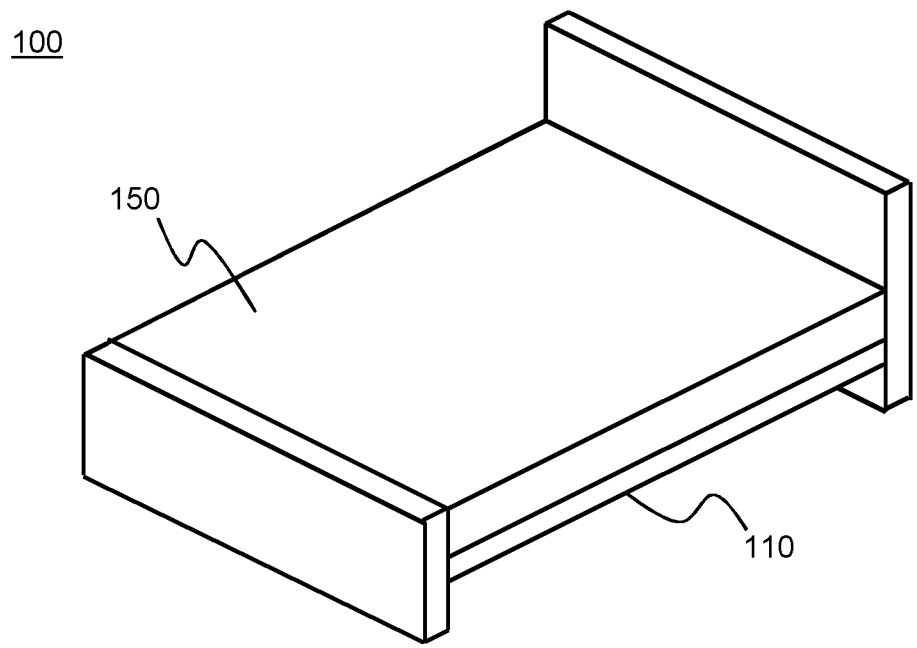
FIG. 1: shows a bed.

FIG. 1 shows a bed 100 comprising a mattress support 110. On the bed 100, a mattress 150 is provided.

Figure 2:
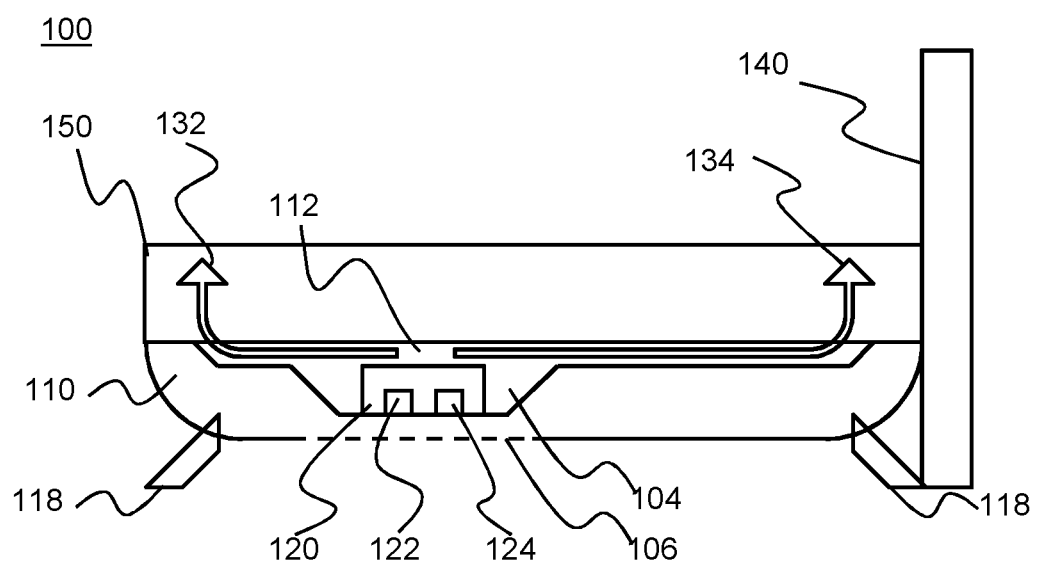
FIG. 2: shows another bed in more detail.

FIG. 2 shows the bed 100 in further detail. In this embodiment, the mattress support 110 is provided with support legs 118 at each corner. The mattress support 110 comprises a pair of stepped recesses. The mattress support 110 comprises a first recess 112, in which a second recess 104 is provided. Within the first recess 112, multiple slats or other means for supporting the mattress 150 above the first recess 112 may be provided. Within the second recess 104, an air treatment unit 120 is provided. The air treatment unit 120 comprises a first fan 122 as an air displacement unit and a first heating element 124. At the end of the bed 100, an optional headboard 140 is provided. The headboard 140 is preferably not fully placed on a ground floor, but provided with legs or other means to ensure a space between the headboard 140 and the floor.

When activated, the air treatment unit 120 takes in air from an environment outside the bed 100, like a sleeping room, via an opening 106 provided at the bottom end of the mattress support 110. The air is subsequently heated by means of the first heating element 124 and by means of the first fan 122 blown through the mattress 150 via the first recess 112. This is indicated by means of the first arrow 132 and the second arrow 134. Preferably, the mattress 150 has a high degree of permeability to let the airflow generated by the first fan 122 easily pass through the mattress 150.

Figure 3:
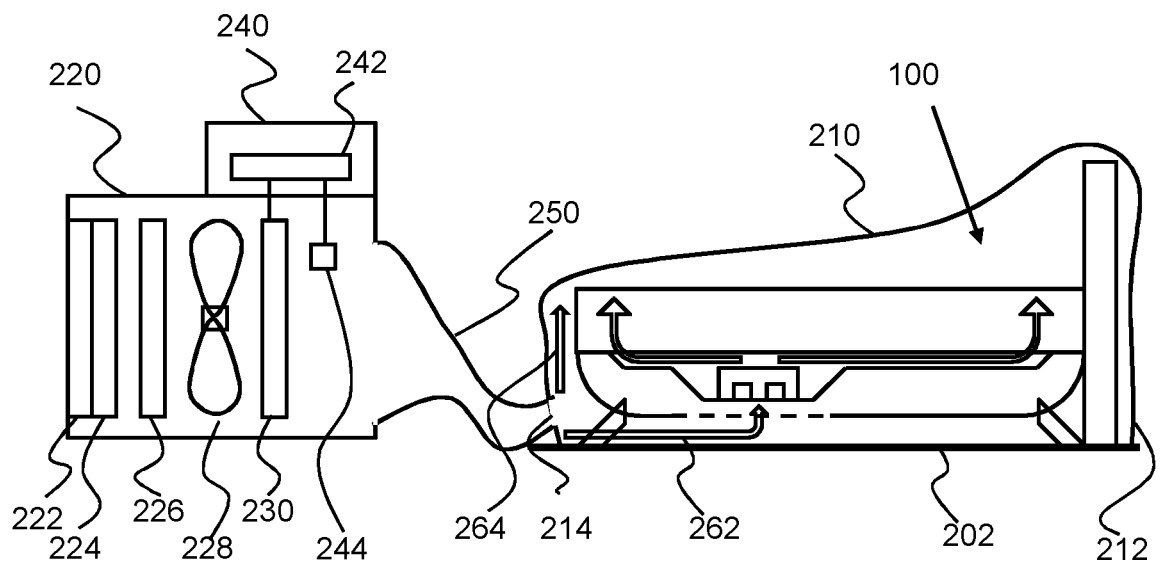
FIG. 3: shows a bed with a sheet over it and a forced air supply.
Figure 4:
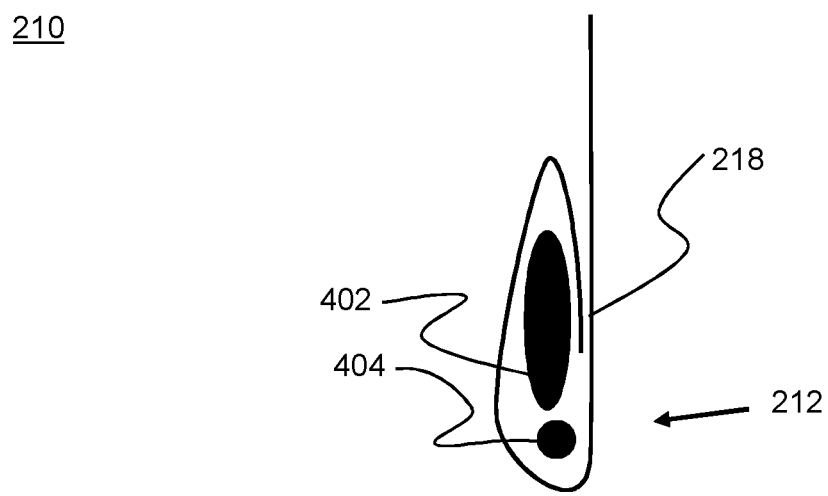
FIG. 4: shows an outer edge of a sheet in further detail.

FIG. 3 shows the bed 100 covered by a sheet 210. The sheet 210 is preferably made out of a flexible air tight or slightly permeable material. The material of the sheet 210 may be woven or non-woven. The sheet 210 may additionally be provided with a liner material to decrease permeability of air through the sheet 210. The sheet 210 may also be provided in a material or combination of materials having isolating and fire resistant properties. The sheet 210 is placed over the bed 100 such that an outer edge 212 of the sheet 210 touches a floor 202 or other surface the bed 100 is placed on. If this is not possible for some reason, the outer edge 212 of the sheet 210 is preferably provided as close to the floor 202 as possible. In order to keep the outer edge 212 of the sheet 210 as close as possible to the floor 202, the outer edge 212 may be provided with one or more ballast elements 402, provided in a seam 218 as shown in FIG. 4.

The ballast elements may be provided as individual elements, provided at regular intervals around the outer edge, as a chain comprising multiple links, the chain being provided around substantially the whole length of the outer edge 212, as a continuous massive elongated element being provided around substantially the whole length of the outer edge 212, other, or a combination thereof. In another embodiment, the ballast element 402 or ballast elements 402 is or are not provided in the seam 218, but are glued, stitched or otherwise attached to the sheet 210. The sheet 210 may be provided in cotton or polyester, as indicated, preferably woven, and lined with a plastic coating. Alternatively, the sheet 210 comprises a non-woven synthetic material.

The density of the material of the ballast element 402 is preferably substantially larger than the density of the material of which most of the sheet 210 is made. For example, most of the sheet 210 may be provided in cotton, polyester, PVC, wool, other or a combination thereof, whereas the ballast elements 402 may be provided in a metal like steel, iron, lead, other, or a combination thereof. A difference in density of a factor of three or more is preferred.

The outer edge 212 is subsequently provided around the legs 118 such that the outer edge 212 defines an outer perimeter of the sheet 210 that is about the same as a perimeter defined by the four legs 118 of the mattress support 110—the footprint of the bed 100. In this way, a space is defined underneath the sheet 210. The circumferential diameter of the outer edge 212 may be fixed. This may in particular be the case if the sheet 210 and the outer edge 212 in particular would be fully provided in a non-elastic material. Alternatively, the outer edge 212 or the full sheet 210 may be provided in an elastic material. FIG. 4 shows a liner 404 comprising elastic and resilient material provided at the outer edge 212 of the sheet 210 and in the seam 218 in particular. The elastic and preferably resilient material of the liner 404 allows the outer edge of the sheet 210 to be arranged to adapt to different footprints of different furniture.

The sheet 210 may be provided as a single and continuous sheet, without a sewn shape. In particular in this embodiment, the outer edge 212 is provided with the liner 404 comprising the elastic and resilient material to ensure the outer edge 212 is fit around the legs 118 and fit to the circumferential perimeter defined by the four legs. Alternatively, the sheet 210 may be provided in a specific shape, preferably the shape of the bed 100. This specific shape may be a three-dimensional shape, established by means of sewing, gluing, stitching, other, or a combination thereof. The shape may be provided having flexible and/or elastic properties, rigid properties or semi-rigid properties for the whole sheet or parts thereof. An advantage thereof is that parts of the sheet are not provided very close to the mattress 150 or right on top of the mattress or bed sheets to enable air to flow along the bed and the upholstery. The exact shape of the bed 100 does not have to be provided, an approximation of the size of the bed 100 by the size of the sheet 210 may be sufficient. This also allows the sheet 210 to be used with different shapes of beds.

The sheet 210 is provided with a first hole 214 near the outer edge 212. When the sheet 210 is provided over the bed 210, the first hole 214 is provided close to the floor 202. To the first hole 214, a first end of a first conduit 250 is connected. The first conduit 250 may be attached to the sheet 210 in a fixed way, for example by means of sewing or stitching. Alternatively, the first conduit 250 is releasably connected to the first hole 214, for example by means of zippers or hooks and loops mating fasteners.

A second end of the first conduit 250 is connected to a forced air supply 220. The forced air supply 220 comprises an HEPA filter 222, a carbon filter 224, a UV lamp 226 as an ozone generator, a fan 228 as an air displacement unit and a second heating element 230. Alternatively or additionally to the HEPA filter 22 and the carbon filter 224, also other types of filters may be used or the filter may be omitted. The UV is also an optional part of the forced air supply 220, primarily intended for providing ozone for treatment of unwanted odours and/or sources of such odours present in the mattress 150. Furthermore, circulation of ozone through the bed 100 and in particular the mattress 150 also kills most, if not all, smaller pest animals, including bacteria, fungi, moulds and other single cell organisms. For such organisms, a heat treatment may not be required in addition to an ozone treatment. This means that with a kit designed to kill such single-cell life forms and moulds, the second heating element 230 may be omitted.

The forced air supply 220 further comprises a first temperature sensor 244 for sensing the temperature of air provided by the fan 228 and heated by the second heating element 230. The first temperature sensor 244 may be an analogue sensor like a resistor of which the resistance is dependent on the surrounding temperature. Alternatively or additionally, the first temperature sensor 244 may be provided in a binary way, like a bimetal switch that switches off if the temperature of the bimetal switch exceeds a specific temperature due to an increased ambient temperature around the bimetal switch.

The first temperature sensor 244 may be connected to a controller 242 provided in a controller module 240. The controller 242 is connected to the second heating element 230. The controller 242 is arranged to control activity of the second heating element 230 in response to a signal received from the temperature 244. Such received signal is to represent a temperature of air heated by the second heating element 230.

The controller 242 may control activity of the second heating element 230 in a gradual way or in a digital or binary way (on or off). It is noted that most types of heating elements, like resistive heating elements, have a certain heat capacity and will therefore not directly return to ambient room temperature and continue to heat air flowing past the second heating element 230. This means that also in case of binary control, the change in temperature of the air provided by the forced air supply 220 will drop directly.

In case the first temperature sensor 244 is provided as a bimetal switch, the bimetal switch also acts as controller if taken up in a supply current loop for providing the second heating element 230 with electrical energy. In other cases, but also with use of a bimetal switch, the controller 242 may be provided as an electronic controller, like a microcontroller.

With the forced air supply 220 activated and the fan 228 and the second heating element 230 in particular, hot air is provided in the space defined by the sheet 210 as shaped around the bed 100. The hot air is provided via the first conduit 250. This results in heated air being provided to the air treatment unit 120. The first heating element 124 may act as a booster for further heating the pre-heated air before providing it to the first recess 112 and through the mattress 150 as indicated by the third arrow 262. Furthermore, as indicated by the fourth arrow 264, air heated by the second heating element 130 may also be provided around the mattress 264. Due to the heated air being forced in the space below the sheet 210, the sheet 210 may be at least partially lifted from the bed 100.

The sheet 210 and in particular the edge thereof is preferably kept as closely to the floor 202 as possible, preferably by means of the ballast elements 402. Additionally or alternatively, laces may be provided for tying the outer edge 212 of the sheet 210 to the legs 118 of the bed 100. As air is provided to the space below the sheet 210, air will flow out of the space. This may be done by providing the sheet 210 in a slightly porous material. Alternatively or additionally, the sheet 210 is not kept very tightly to the ground 202, allowing for air to flow out of the space defined by the sheet 210.

To ensure fast and efficient killing of bed bugs and/or other pest animals, the temperature of air provided to the space is preferably at least 47 degrees Centigrade. On the other hand, the temperature should not be too high to prevent damage to the bed 100, the mattress 150, the air treatment unit 120. Therefore, the air provided to the space does preferably not exceed 60 degrees Centigrade. Because air heated by the forced air supply 220 may cool down while travelling through the first conduit 250, the controller 242 preferably controls heating of the air such that air provided to the space is controlled between 55 degrees Centigrade and 60 degrees Centigrade. In order to reach this, the second heating element 230 may heat air to a temperature of up to 75 degrees centigrade. With temperature loss due to transport through the first conduit 250, the air reaching the bed 100 has a temperature between 50 degrees Centigrade and 55 degrees centigrade.

The forced air supply 220 preferably provides about 3 cubic metres of heated air per minute to the space defined by the sheet 120. Not all of this is taken up by the air treatment unit 120 and provided through the mattress. Excess air provided by the forced air supply 220 will also flow around the bed 100 and the mattress 150 in particular. This results in heating of the outside of the bed 100 and the mattress 150 and elimination of bed bugs in- and outside of the mattress in a relatively short timeframe, as compared to only heating through the mattress 150 or only around the mattress 150.

Figure 5:
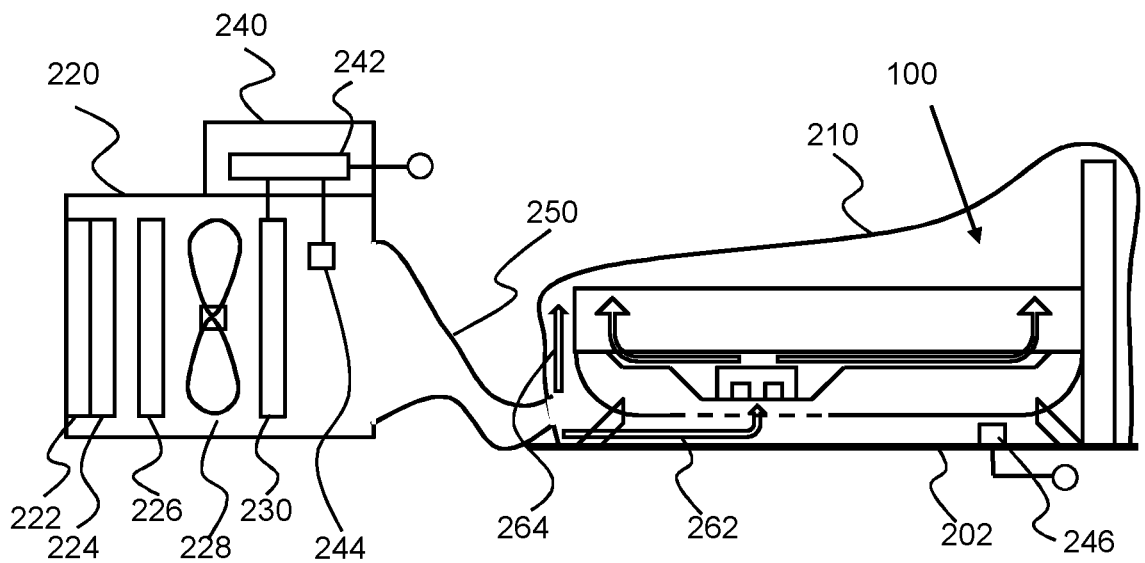
FIG. 5: shows a bed with a sheet over it, a forced air supply and an additional temperature sensor.

FIG. 5 shows the bed 100 and the forced air supply 220 in a similar constellation. In addition to the first temperature sensor 244, also a second temperature sensor 246 is provided and connected to the controller 242. The second sensor 246 is preferably provided at a location within the space defined by the sheet 210 where temperature is expected to be the lowest within the space. If the temperature at the coolest location drops below 50 degrees Centigrade or even below 47 degrees Centigrade, supply of heated air may be increased. To this end, also an electromotor as a driving unit for the fan 228 may be connected to the controller 242 to be controlled by the controller in response to a temperature sensed by the first temperature sensor 244 and/or the second temperature sensor 246. Alternatively or additionally, activity of the second heating element 230 may be increased.

Input from the second temperature sensor 246, preferably located at the coolest location in the space defined by the sheet 210, may also be used for ensuring extermination of pest animals in a worst case scenario. For that purpose, the controller 242 may be arranged to switch off the forced air supply 220 if the signal received from the second temperature sensor 246 indicates the temperature has been above a pre-determined value for a pre-determined amount of time. A pre-determined temperature may be 50 degrees Centigrade, a pre-determined amount of time may be an hour.

Figure 6:
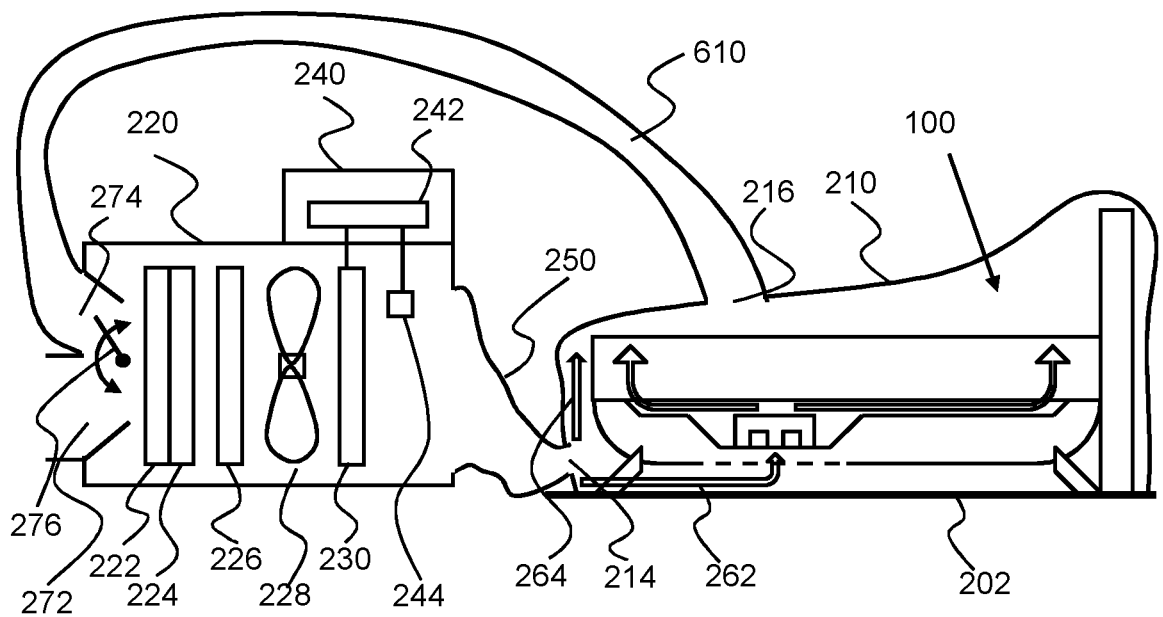
FIG. 6: shows a bed with a sheet over it and a second conduit for connecting spaced under the sheet to an inlet of the forced air supply.

FIG. 6 shows the bed 100 with the sheet 210 and the forced air supply 220 in another configuration. In the sheet 210, a second hole 216 is provided. The second hole 216 is connected to an inlet of the forced air supply 220 via a second conduit 610. The inlet of the forced air supply 220 may be arranged to only take in air via the second conduit 610, only from a room where the forced air supply 220 is located, other, or a combination thereof.

Allowing for the forced air supply 220 to take in air from the space defined by the sheet 210 means the forced air supply 220 will take in heated air, thus reducing an energy requirement for the second heating element 230. To prevent the second conduit 610 to close due to a suction power provided by the inlet of the forced air supply 220, struts may be provided along the second conduit 610. Support of the second conduit 610 may also be provided by providing a spiral within or just outside the second conduit 610. Conduits supported by a metal or plastic metal spiral are commercially available. Alternatively or additionally, the second conduit is provided in a relatively rigid material, woven or non-woven, thus reducing or removing a need for support of the second conduit 610 by means of struts.

In addition to the second hole 216, multiple holes may be provided in the sheet for recirculation of air. The multiple holes are via sub-ducts connected to the second duct 610. The forced air supply 220 provides a suction force through the second duct 610 and to the multitude of holes. This suction force improves circulation of heated air around the bed 100. Preferably, at least one of the multitude of holes for taking air from the space is provided at the head end of the bed 100. In a further embodiment based on the principle of recirculation of air, the second heating element 230 may be switched off and air is not recirculated anymore, while the fan 228 continues to operate. Instead thereof, cool air is taken in from outside the space defined by the cover 210. This is preferably done after the pre-determined temperature has been achieved for a pre-determined amount of time, as discussed above. This allows the bed 100 to cool down in a relatively quick way, allowing the bed 100 to be used faster.

To enable switching between recirculation and faster cooling off, the forced air supply 220 is provided with a first air inlet 272 for taking in air from the room and a second air inlet 274 connected to the second hole 216 via the second duct 610. The forced air supply 220 may take in air from the room via the first air inlet 272, from the space defined by the cover 210 via the second inlet 274, or both. From which source air is taken in, is controlled by a valve 276. The position of the valve 276 may be moved in directions indicated by the arced arrow in FIG. 6. The valve may fully close off the first air inlet 272 in a lower position or close off the second air inlet 274 in an upper position. In a centre position, both the first air inlet 272 and the second air inlet 274 are open. The valve 276 may be moved stepless from the upper position to the lower position and vice versa.

The position of the valve 276 may be controlled by the controller 242, manually, otherwise, or a combination thereof. In particular switching from recirculation of air via the second duct 610 to taking in air from the room for cooling the bed is preferably done automatically, controlled by the controller 242. The valve 276 as shown here is a swinging valve. Alternatively or additionally, also dampers, linearly moving valves, any other types of valves or combinations thereof may be used.

In summary, the disclosure relates to a kit for extermination of pest animals in furniture and a method for using the kit are disclosed. A sheet is provided over upholstered furniture. The sheet may be provided with ballast at the edges for keeping the sheet more or less fixed. Heated air is forced underneath the sheet. The furniture is preferably provided with an air treatment module for forcing air through the upholstery like a mattress. This allows the heated air provided by the forced air supply to be provided to the upholstery via the inside, highly increasing efficiency of heat treatment of the furniture. A way of controlling temperature of air provided by the forced air supply is disclosed, as well as a way of controlling temperature of air actually within the spaced defined by the positioned sheet. The latter allows for improved control of maintaining a temperature at which for example bed bugs are killed.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

In the description above, it will be understood that when an element such as layer, region or substrate is referred to as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Just as well may the invention be embodied using more elements than depicted in FIG. 1, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A kit for air treatment of upholstered furniture, the kit comprising:
   a cover sheet for covering the furniture, the cover sheet being arranged to define a space having substantially similar dimensions as outer dimensions of the furniture, the space being open at the bottom and the sheet comprising:
   an outer edge being arranged to define the open bottom of the space by an outer perimeter of the sheet having a sheet edge circumferential dimension substantially similar to a furniture footprint circumferential dimension, wherein the outer edge is provided with at least one ballast unit configured to maintain substantially the whole length of the outer edge close to or in contact with a ground plane on which the furniture is placed; and
   a first opening provided in the vicinity of the outer edge for receiving air from a forced air supply unit in the space;
   a forced air supply module for providing heated air, the forced air supply module comprising:
   an air displacement module for displacing air;
   a heating module for heating air taken in;
   a first temperature sensor for sensing a temperature of heated air;
   a control module connected to the first temperature sensor and the heating module for controlling heating activity of the heating module in response to a signal provided by the first temperature sensor; and
   a first duct for connecting the forced air supply module to the first opening provided in the sheet for providing air heated by the forced air supply unit to the to the space defined by the sheet;
   wherein the cover is large enough to keep the outer edge defining the open bottom on or at least in the vicinity of the ground plane on which the furniture is placed, allowing for air to flow out of the open bottom of the space defined by the sheet between the outer edge of the sheet and the ground plane.

2. The kit according to claim 1, the ballast unit comprising a material having a density substantially larger than the density of a material comprised by the sheet.

3. The kit according to claim 1, wherein the ballast unit comprises at least one of the following:
   a chain comprising multiple links, the chain being provided at substantially the full outer edge;
   a continuous elongated element provided at substantially the full outer edge; or
   individual ballast elements spaced apart at substantially regular intervals.

4. The kit according to any of the claim 1, wherein the outer edge of the cover sheet is provided with a seam and the ballast unit is provided in the seam.

5. The kit according to claim 1, wherein the control module comprises at least one of the following:
   a bimetallic switch of which a switching action is responsive to temperature changes in the heated air; or
   an electronic control module arranged to control the heating module in response to reception of a signal from the first temperature sensor, the signal representing a temperature sensed by the first temperature sensor.

6. The kit according to claim 1, wherein the control module is arranged to control the heating module such that the heated temperature is controlled between 47 degrees Centigrade and 60 degrees Centigrade.

7. The kit according to claim 1, wherein the control module is arranged to control the heating module such that the heated temperature is controlled between 55 degrees Centigrade and 60 degrees Centigrade.

8. The kit according to claim 1, the control module being arranged to be connected to a second temperature sensor for receiving a temperature signal from the sensor, the control module being arranged to switch off the forced air supply if the temperature signal indicates a temperature level above a pre-determined threshold for a predetermined period of time.

9. The kit according to claim 1, the control module being arranged to be connected to a second temperature sensor for receiving a temperature signal from the sensor, the control module being arranged to increase activity of the air displacement module if the temperature signal indicates a temperature level below a pre-determined threshold for a pre-determined period of time.

10. The kit according to claim 1, the forced air module further comprising an ozone generator for generating ozone and providing the ozone to the space defined by the cover sheet.

11. The kit according to claim 1, wherein the cover sheet is provided with a second opening, the second opening being located substantially at the top of the space and the kit further comprises a second duct for connecting the second opening to the forced air supply module for providing air from the space to the forced air supply module.

12. A method of exterminating pest animals from upholstered furniture, the method comprising:
  providing a kit for air treatment of upholstered furniture, the kit comprising:
  a cover sheet for covering the furniture, the cover sheet being arranged to define a space having substantially similar dimensions as outer dimensions of the furniture, the space being open at the bottom and the sheet comprising:
    an outer edge being arranged to define the open bottom of the space by an outer perimeter of the sheet having a sheet edge circumferential dimension substantially similar to a furniture footprint circumferential dimension, which outer edge is provided with at least one ballast unit; and
    a first opening provided in the vicinity of the outer edge for receiving air from a forced air supply unit in the space;
  a forced air supply module for providing heated air, the forced air supply module comprising:
    an air displacement module for displacing air;
    a heating module for heating air taken in;
    a first temperature sensor for sensing a temperature of heated air;
    a control module connected to the first temperature sensor and the heating module for controlling heating activity of the heating module in response to a signal provided by the first temperature sensor; and
    a first duct for connecting the forced air supply module to the first opening provided in the sheet for providing air heated by the forced air supply unit to the to the space defined by the sheet;
  wherein the cover is large enough to keep the outer edge defining the open bottom on or at least in the vicinity of a ground plane on which the furniture is placed, allowing for air to flow out of the open bottom of the space defined by the sheet between the outer edge of the sheet and the ground plane;
  laying the cover sheet over the furniture, such that the outer edge is provided on or at least in the vicinity of a ground plane on which the furniture is placed;
  connecting the force air supply module to the opening in the sheet, via a conduit;
    providing heated air to the space defined by the cover sheet via the conduit; and
  exhausting at least part of the heated air out of open bottom of the space defined by the sheet between the outer edge of the sheet and the ground plane.

13. The method according to claim 12, wherein the furniture comprises an arrangement for providing an airflow through the upholstery, the method further comprising activating the arrangement for providing the airflow.

14. The method according to claim 13, wherein the arrangement for providing an airflow comprises a heating module for heating air for the airflow, the method further comprising activating the heating module.

* * * * *